US009981493B2

United States Patent
Tada et al.

(10) Patent No.: US 9,981,493 B2
(45) Date of Patent: May 29, 2018

(54) POWER SUPPLY APPARATUS, PRINTING APPARATUS, AND CONTROL METHOD

(71) Applicant: CANON KABUSHIKI KAISHA, Tokyo (JP)

(72) Inventors: Shuhei Tada, Kawasaki (JP); Akira Miyashita, Tokorozawa (JP); Takayuki Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/257,202

(22) Filed: Sep. 6, 2016

(65) Prior Publication Data

US 2017/0096023 A1    Apr. 6, 2017

(30) Foreign Application Priority Data

Oct. 2, 2015 (JP) .................................. 2015-196973

(51) Int. Cl.
| | |
|---|---|
| *H02M 3/335* | (2006.01) |
| *B41J 23/00* | (2006.01) |
| *H02M 7/06* | (2006.01) |
| *H02M 7/217* | (2006.01) |
| *H02M 1/00* | (2006.01) |

(52) U.S. Cl.
CPC ......... *B41J 23/00* (2013.01); *H02M 3/33507* (2013.01); *H02M 7/06* (2013.01); *H02M 7/217* (2013.01); *H02M 2001/0035* (2013.01); *H02M 2001/0058* (2013.01); *Y02B 70/1491* (2013.01); *Y02B 70/16* (2013.01)

(58) Field of Classification Search
CPC . H02M 2001/0032; H02M 2001/0035; H02M 3/335; H02M 3/33507; H02M 3/33523; H02M 3/33569; H02M 3/3376; H02M 7/06; H02M 7/217
See application file for complete search history.

(56) References Cited

U.S. PATENT DOCUMENTS

| | | | |
|---|---|---|---|
| 2006/0044845 A1* | 3/2006 | Fahlenkamp | ..... H02M 3/33523 363/21.15 |
| 2007/0041225 A1* | 2/2007 | Fahlenkamp | ..... H02M 3/33507 363/21.01 |

(Continued)

FOREIGN PATENT DOCUMENTS

JP           5179893 B2    4/2013

*Primary Examiner* — Fred E Finch, III
(74) *Attorney, Agent, or Firm* — Fitzpatrick, Cella, Harper & Scinto

(57) ABSTRACT

In a conventional current resonance switching power source, the burst period of a burst operation could not be sufficiently prolonged, and the efficiency characteristics were insufficient in a light load. In order to improve this, an embodiment of the present invention generates, upon operating in the burst mode, a control signal in accordance with a comparison result of a first reference voltage and a secondary side voltage of a transformer and a comparison result of a second reference voltage and the secondary side voltage of the transformer. Subsequently, the oscillation operation timing of an oscillator that performs an oscillation operation to the transformer and the oscillation frequency that changes the voltage excited on the secondary side of the transformer are controlled based on the control signal.

13 Claims, 11 Drawing Sheets

(56) References Cited

U.S. PATENT DOCUMENTS

| | | | |
|---|---|---|---|
| 2012/0250378 A1* | 10/2012 | Kok | H02M 3/156 363/78 |
| 2013/0229829 A1* | 9/2013 | Zhang | H02M 3/33546 363/16 |
| 2014/0016362 A1* | 1/2014 | Adragna | H02M 3/158 363/21.02 |
| 2014/0043002 A1* | 2/2014 | Chung | H02M 1/08 323/283 |
| 2015/0094873 A1* | 4/2015 | Ohhashi | B41J 29/393 700/297 |
| 2015/0244274 A1* | 8/2015 | Fahlenkamp | H02M 3/33507 363/21.15 |
| 2016/0181934 A1* | 6/2016 | Kikuchi | H02M 3/33523 363/21.14 |
| 2016/0315541 A1* | 10/2016 | Chen | H02H 3/027 |
| 2017/0054374 A1* | 2/2017 | Fang | H02M 3/33523 |

* cited by examiner

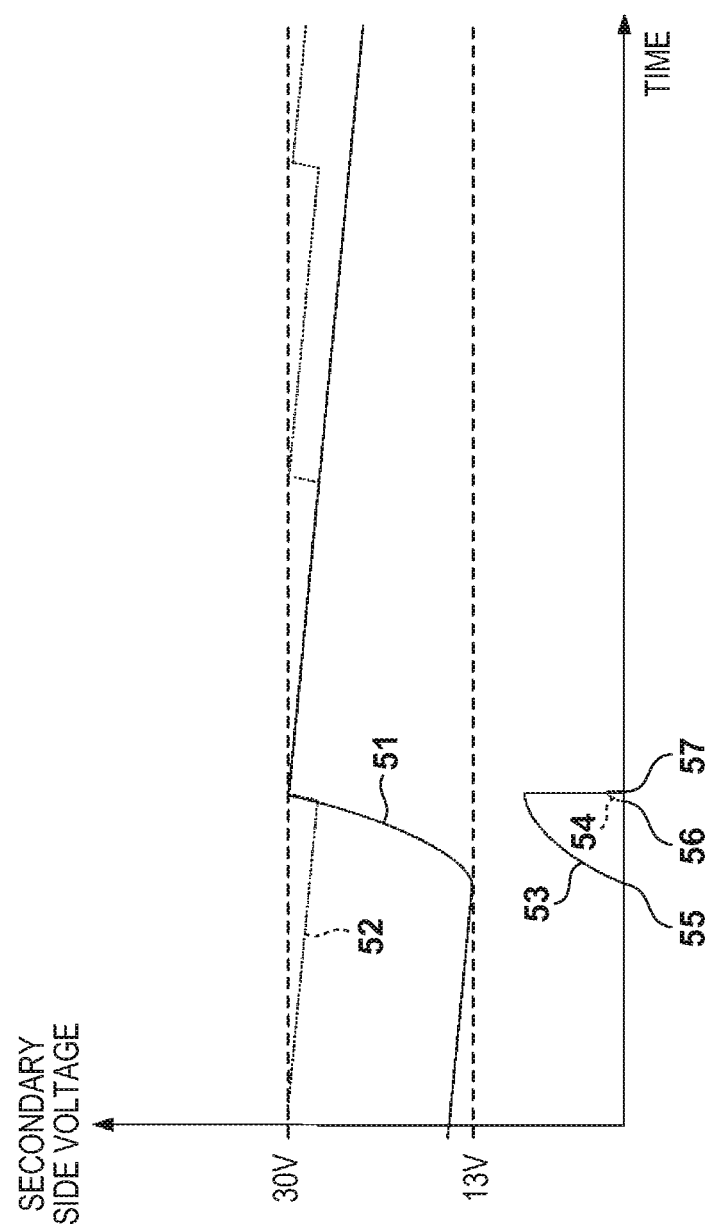

POWER SUPPLY APPARATUS, PRINTING APPARATUS, AND CONTROL METHOD

BACKGROUND OF THE INVENTION

Field of the Invention

The present invention relates to a power supply apparatus, a printing apparatus, and a control method, and particularly to a power supply apparatus, a printing apparatus, for example, that uses the power supply apparatus, for printing an image on a print medium using an inkjet printhead, and a control method.

Description of the Related Art

For example, a large-format printer apparatus that prints on a large size print medium such as A0 or B0 requires large power for its operation. Thus, in such an apparatus, a current resonance (LLC method) switching power source that can obtain high voltage conversion efficiency at the time of large power supply is widely used. Japanese Patent No. 5179893 discloses an arrangement that includes a burst mode based on this current resonance switching power source. In addition, Japanese Patent No. 5179893 discloses an arrangement that further shortens the soft start time at the start of oscillation in the burst mode than that in a normal activation and performs a burst operation based on a secondary side voltage and further evaluating a feedback signal from the secondary side by using two thresholds.

A predetermined amount of self-consumption occurs during the oscillation period regardless of amount of the load in the current resonance switching power source. Hence, in the current resonance switching power source, a burst operation is excited first, and then the time ratio of the oscillation operation period to a burst period is made small in order to lower the ratio of self-consumption power amount to a load power amount and improve the efficiency when the load is light. Note that in the same manner as in the normal activation, in the start of oscillation during the burst operation, a soft start operation is effective in suppressing element stress and overshooting. The soft start operation in the current resonance switching power source mentioned here is, in particular, an operation that gradually decreases the frequency after starting the oscillation from a high frequency.

In Japanese Patent No. 5179893, the aforementioned time ratio is made smaller by shortening the soft start time in the burst mode than that in the normal activation. In addition, in Japanese Patent No. 5179893, stabilization of secondary side outputs in the burst mode is obtained by controlling the start and stop of oscillation in the burst mode based on the secondary side voltage. Furthermore, in Japanese Patent No. 5179893, a burst period that leads to improvement of efficiency is ensured by evaluating the feedback signal from the secondary side by two thresholds so that a secondary side voltage fluctuation falls within a predetermined value.

The arrangement of Japanese Patent No. 5179893 ensures the burst period while causing the secondary side voltage fluctuation to fall within the predetermined value by evaluating the feedback signal from the secondary side by using two thresholds and evaluates the feedback signal after the error amplifier which is generally designed to have a high gain. That is, each threshold and a voltage amplified several ten to several hundred times by the error amplifier are compared to determine the burst period. Hence, the secondary side voltage fluctuation width falls within a comparatively small range as a result. As a result of the voltage fluctuation width falling within a small range, the oscillation operation count per unit time has a tendency to increase.

As examined above, in the aforementioned conventional technique, the oscillation operation count for the burst period tends to increase, and it may be difficult to implement reduction of power consumption.

SUMMARY OF THE INVENTION

Accordingly, the present invention is conceived as a response to the above-described disadvantages of the conventional art.

For example, a power supply apparatus, a printing apparatus, and a control method according to this invention are capable of implementing reduction of power consumption.

According to one aspect of the present invention, there is provided a power supply apparatus that includes a current resonance switching power source and operates in one of a first mode and a second mode, comprising: a transformer, including a current resonance circuit, configured to receive, on a primary side, a direct voltage obtained by rectifying a received AC voltage and output, from a secondary side, a voltage different from the direct voltage received on the primary side; an oscillator configured to perform an oscillation operation to the transformer; a first reference voltage source configured to output a first reference voltage; a second reference voltage source configured to output a second reference voltage lower than the first reference voltage; and a controller configured to: control, in a case where the first mode is instructed by a switching signal which is received from outside and instructs switching of the first mode and the second mode, an oscillation frequency that changes an oscillation operation timing of the oscillator and a voltage excited on the secondary side of the transformer in accordance with a difference between the first reference voltage and an output voltage from the transformer; and control, in a case where the second mode is instructed by the switching signal, the oscillation frequency that changes the oscillation operation timing of the oscillator and the voltage excited on the secondary side of the transformer based on a control signal generated in accordance with a comparison result of the first reference voltage and the output voltage from the transformer and a comparison result of the second reference voltage and the output voltage from the transformer.

This invention is particularly advantageous since, for example, the burst period of a burst mode is significantly extended and the ratio of the oscillation operation period to the burst period can be smaller as a result. Hence, reduction of power consumption can be implemented.

Further features of the present invention will become apparent from the following description of exemplary embodiments (with reference to the attached drawings).

BRIEF DESCRIPTION OF THE DRAWINGS

FIG. 12 is a chart showing waveforms in a burst mode.

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element" generically means an ink orifice or a liquid channel communicating with it, and an element for generating energy used to discharge ink, unless otherwise specified.

<Outline of Printing Apparatus (FIGS. 1 and 2)>

Figure 1:
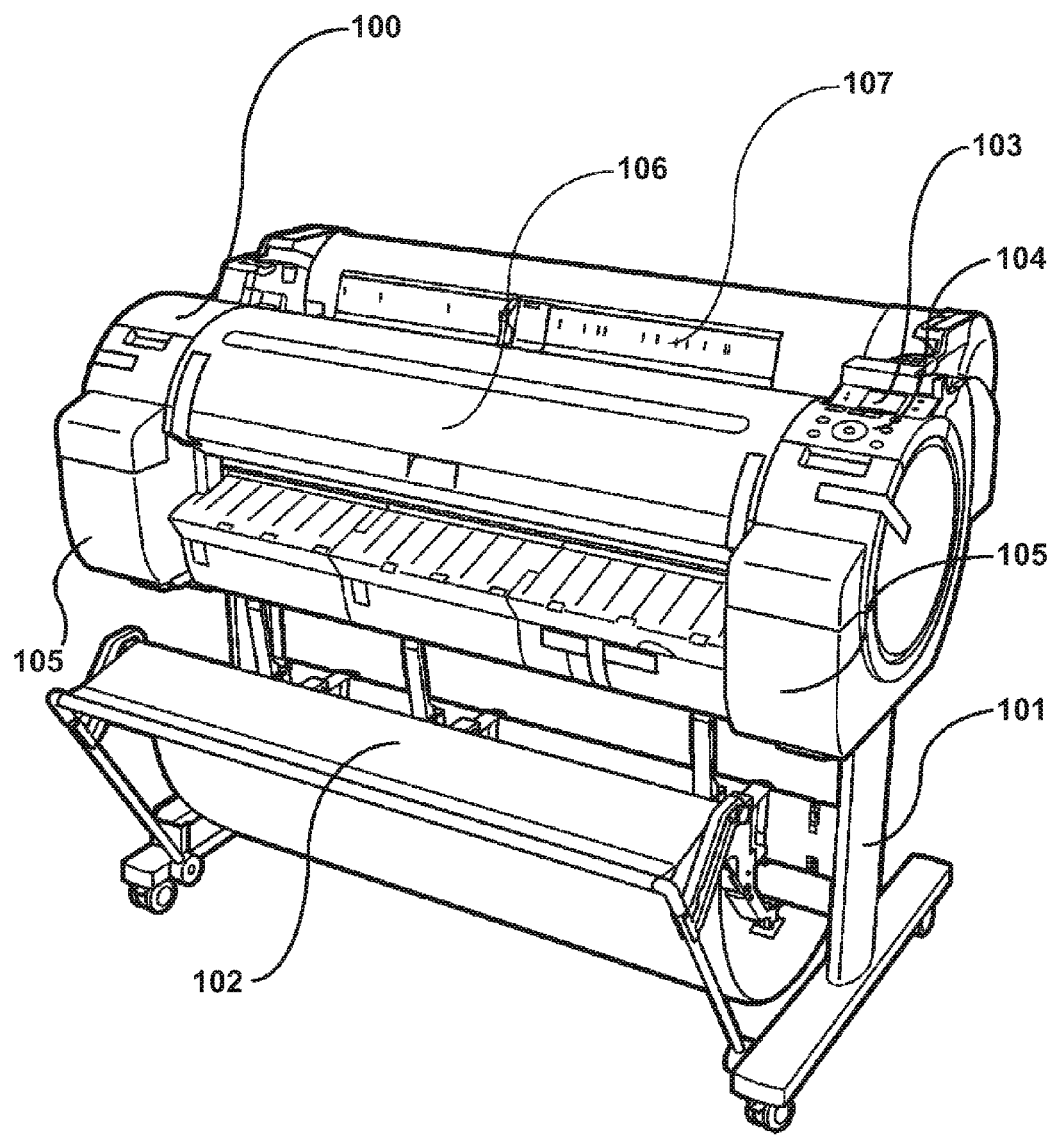
FIG. 1 is a perspective view showing an overview of the arrangement of an inkjet printing apparatus (printing apparatus) according to an exemplary embodiment of the present invention.

FIG. 1 is a perspective view showing the outer appearance of an inkjet printing apparatus that uses a large print medium in the A0 or B0 size according to an exemplary embodiment of the present invention.

An inkjet printing apparatus (to be referred to as a printing apparatus hereinafter) 100 shown in FIG. 1 can print on a 10 to 60 inch-sized rolled print medium (for example, roll paper). The printing apparatus 100 includes a stand 101 on which the main body is placed, and a stacker 102 on which discharged print paper is stacked. A display panel 103 used to display various kinds of print information and setting results and an operation panel 104 used to set a print mode or print paper are disposed on the upper surface of the printing apparatus 100. The printing apparatus 100 also includes an upper cover 106 that can be opened/closed.

Ink tank accommodation units 105 used to accommodate ink tanks of black, cyan, magenta, yellow, and the like and supply inks to a printhead are arranged on both sides of the printing apparatus 100.

The inkjet printing apparatus 100 can use not only roll paper but cut paper as well. Cut paper is stacked on a paper feed unit 107, and cut paper is fed and conveyed one by one inside the inkjet printing apparatus 100 in accordance with the progression of the printing operation.

Note that due to the size of the print medium used by this printing apparatus, this kind of printing apparatus can be referred to as a large-format printer.

Figure 2:
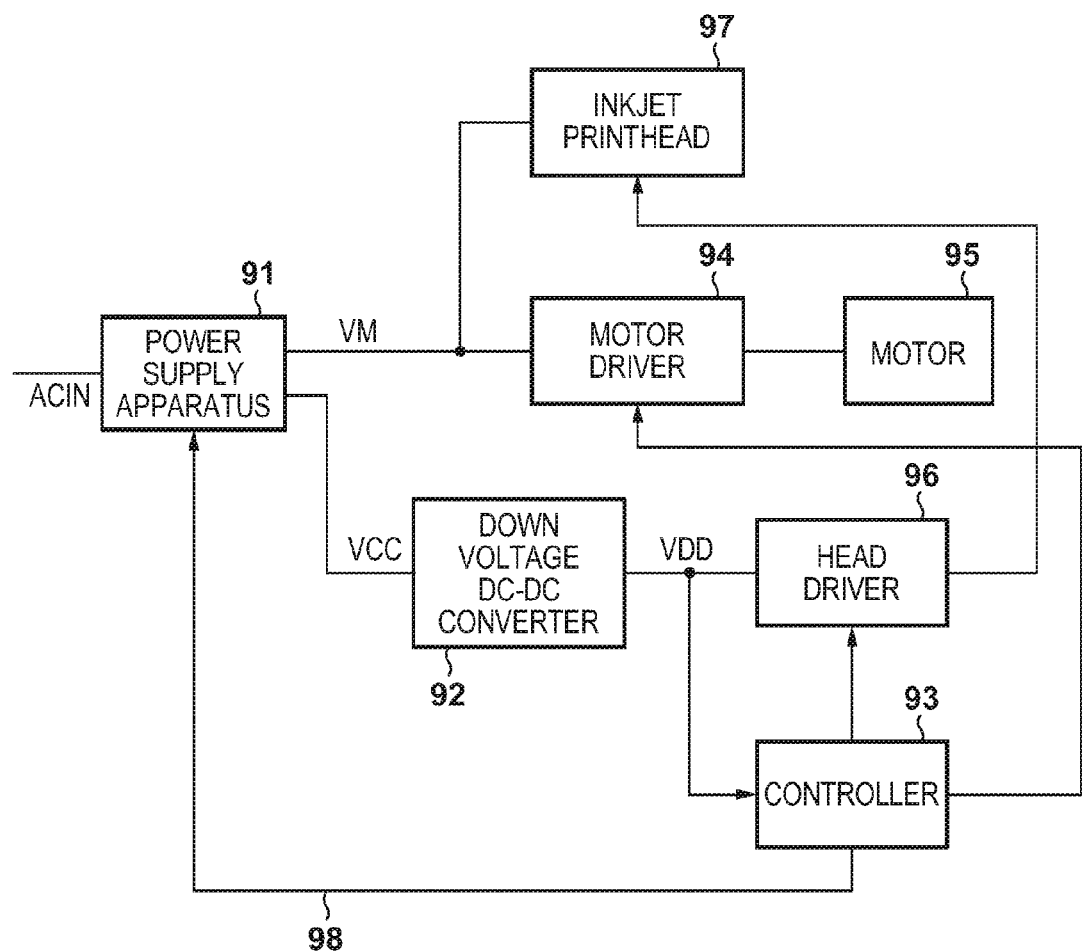
FIG. 2 is a block diagram showing a control arrangement of the printing apparatus shown in FIG. 1.

FIG. 2 is a block diagram showing the control arrangement of the printing apparatus shown in FIG. 1.

As shown in FIG. 2, the inkjet printing apparatus 100 includes a power supply apparatus 91 that outputs two voltages, that is, VM (high voltage) and VCC (low voltage) and a down voltage DC-DC converter 92 that receives the low voltage VCC as the input voltage, lowers the VCC to VDD, and outputs the VDD. The inkjet printing apparatus 100 also includes a controller 93, a motor driver 94, a motor 95, and a head driver 96 that executes image processing and generates a head control signal. The controller 93 controls the operation of an inkjet printhead 97 (to be referred to as a printhead hereinafter) via the head driver 96. The controller 93 controls, by a switching signal 98, the switching of operation modes of the power supply apparatus 91 which operates under two modes, that is, a burst mode and a normal mode. Note that the power consumption amount per unit time when the power supply apparatus is operating under the burst mode is less than the power consumption amount per unit time when it is operating under the normal mode.

The motor driver 94 controls the driving of the motor 95 based on an instruction from the controller 93. However, the motor current can be set to "zero". At this time, the current consumption of the motor 95 is approximately "zero" even in a state in which the high voltage VM continues to be applied. The head driver 96 outputs a discharge control signal to the printhead 97 based on the control by the controller 93. When a discharge stop instruction is issued from the controller 93, the head driver 96 stops the discharge control to the printhead 97, thereby causing the power consumption of the printhead 97 to be approximately "zero" even in a state in which the high voltage VM continues to be applied. At the same time, power consumption in the head driver 96 is reduced dramatically as the internal operation of the printhead 97 also stops.

The power supply apparatus 91 may incorporate a PFC (Power Factor Correction circuit). In such a case, it is desirable to have an arrangement in which the PFC operation stops when it is to operate in the burst mode. Other than issuing an instruction to shift to the burst mode during the power-saving mode, the controller 93 controls the entire sequence related to the printing function.

Embodiments of the power supply apparatus that is implemented in the printing apparatus having the above arrangement will be described next.

[First Embodiment]

<Arrangement of Power Supply Apparatus (FIGS. 3 and 4)>

Figure 3:
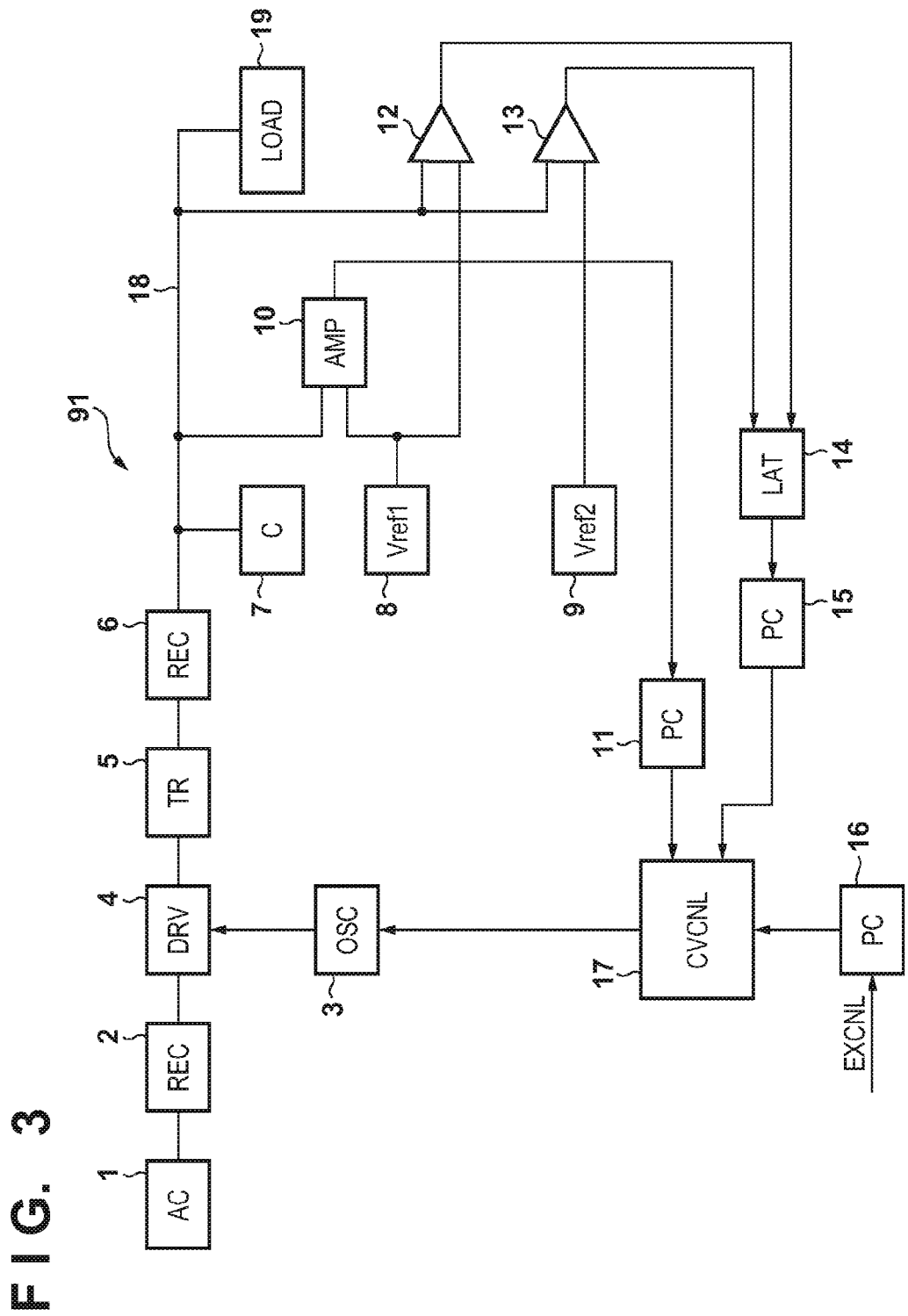
FIG. 3 is a block diagram showing the arrangement of a power supply apparatus.

FIG. 3 is a block diagram showing the arrangement of a power supply apparatus 91 according to the first embodiment.

As shown in FIG. 3, the power supply apparatus 91 includes an input unit (AC) 1 that inputs an AC voltage, a rectifier (REC) 2, an oscillator (OSC) 3, a driver (DRV) 4, a transformer (TR) 5 that includes a current resonance circuit, a secondary side rectifier (REC) 6, and a secondary side capacitor (C) 7. The power supply apparatus 91 also includes a reference voltage source (Vref1) 8, a reference voltage source (Vref2) 9, an error amplifier (AMP) 10, photocouplers (PCs) 11, 15, and 16, comparators 12 and 13, a latch circuit (LAT) 14, and a current/voltage conversion controller (CVCNL) 17. A secondary side voltage 18 is output from the secondary side rectifier (REC) 6 to a load 19.

For example, a primary voltage of AC 100 V (50 Hz/60 Hz), which is the electricity distributed in general in Japan, is input to the input unit (AC) 1. In practice, a fuse for ensuring safety, a noise filter, an inrush current relaxation current, and the like are used in combination.

The rectifier (REC) 2 is formed in general by a diode bridge and rectifies the alternating current AC to obtain a direct current DC that has been smoothed by using a primary side electrolyte capacitor in combination. The oscillator (OSC) 3, together with performing an oscillation operation and an oscillation stop operation, controls its own oscillation frequency fosc in accordance with a control voltage Vc output from the current/voltage conversion controller (CVCNL) 17. Here, assume that the oscillation stops when the control voltage Vc is less than 0.5 V (less than the first threshold), that the oscillation starts at the highest frequency when Vc=0.5 V (first threshold), and that the oscillation frequency gradually decreases to the lowest frequency as Vc rises from 0.5 V to 5 V. Note that, in this example, the highest frequency fmax is 333 kHz and the lowest frequency fmin is 33 kHz. The driver (DRV) 4 applies the direct current DC obtained from the rectifier (REC) 2 to the transformer (TR) 5 that includes the current resonance circuit of a subsequent stage, while switching the voltage DC in accordance with the output from the oscillator (OSC) 3.

Since the arrangement and operation of the current resonance circuit (LLC method) is known, a simple description will be given.

The driver (DRV) 4 is formed from two current switches, a high-side switch and a low-side switch, provided with a suitable dead time to prevent through current, and exclusively turned on and off. When the high-side switch is on, the direct current DC output from the rectifier (REC) 2 is applied to the transformer (TR) 5 including the current resonance circuit (to be referred to as a transformer hereinafter). In contrast, when the low-side switch is turned on, 0 V is applied to the transformer (TR) 5. The transformer (TR) 5 is formed by a current resonance capacitor and a transformer which includes a suitably designed leakage inductance.

The secondary side rectifier (REC) 6 rectifies the alternating output that is generated on the secondary side winding of the transformer (TR) 5. In general, full wave rectification is performed, and a low loss Schottky diode is used on the secondary side rectifier (REC) 6 since the reverse voltage is comparatively low. The secondary side capacitor (C) 7 can make the output rectified on the secondary side rectifier (REC) 6 smooth. If the oscillation of oscillator (OSC) 3 has stopped, a load current is provided from the discharge of the secondary side capacitor (C) 7.

The reference voltage source 8 generates a voltage Vref1 which becomes the target value of the secondary side voltage 18 in normal mode and the upper limit value of the secondary side voltage 18 in the burst mode. Here, assume that this output voltage Vref1 is 30 V. The reference voltage source 9 is set lower than the output voltage from the reference voltage source 8 (Vref1=30 V) and generates a voltage Vref2 which becomes the lower limit value of the secondary side voltage 18 in the burst mode. Here, assume that this output voltage Vref2 is 13 V. The error amplifier (AMP) 10 calculates the difference between the secondary side voltage 18 and the reference voltage source 8 and outputs a current by applying a filter having a suitable characteristic. The current output of the error amplifier (AMP) 10 increases as the secondary side voltage 18 becomes higher than the output voltage Vref1 from the reference voltage source 8. Note that the burst mode is a mode in which the power supply is controlled by causing the oscillator to execute an oscillation operation for a predetermined time and stop the oscillation operation repeatedly.

Upon receiving the current output from the error amplifier (AMP) 10, the photocoupler (PC) 11 transmits the current to the current/voltage conversion controller (CVCNL) 17.

The comparator 12 compares the secondary side voltage 18 and the output from the reference voltage source 8 and transmits the result to the latch circuit (LAT) 14. The comparator 12 outputs a high-level signal if the secondary side voltage 18 is higher than the output voltage Vref1 from the reference voltage source 8. The comparator 13 compares the secondary side voltage 18 and the output voltage Vref2 from the reference voltage source 9 and transmits the result to the latch circuit (LAT) 14. The comparator 13 outputs a low-level signal if the secondary side voltage 18 is lower than the output voltage Vref2 from the reference voltage source 9. The latch circuit (LAT) 14 holds high level when the output signal from the comparator 12 changes to high level. The latch circuit (LAT) 14 changes to low level when the output signal from the comparator 13 changes to low level and the latch is released.

The photocoupler (PC) 15 turns on when the latch circuit (LAT) 14 is held at high level and supplies a current corresponding to the level to the current/voltage conversion controller (CVCNL) 17. On the other hand, when the latch circuit (LAT) 14 is at a low-level state, the photocoupler (PC) 15 turns off and "zero" current is supplied to the current/voltage conversion controller (CVCNL) 17. Based on an external control signal EXCNL, the photocoupler (PC) 16 is turned on in the normal mode, turned off in the burst mode, and transmits the selected mode to the current/voltage conversion controller (CVCNL) 17. If no secondary side power supply source is present, such as the start of supplying alternating current to the power supply apparatus 91, the photocoupler (PC) 16 is inevitably turned off and is in an equivalent state with the burst mode.

The load 19 indicates the aggregate of the controller 93, the motor 95, the motor driver 94, the head driver 96, the printhead 97, and the down voltage DC-DC converter 92 that further converts the voltage output from the power supply apparatus 91 into a low voltage. The relationship of a suitable voltage for operating the elements forming the load 19, the output voltage Vref1 from the reference voltage source 8, and the output voltage Vref2 from the reference voltage source 9 is as follows.

That is, the suitable voltage for operating, for example, the motor 95, the motor driver 94, and the printhead 97 which should operate in a normal operation, matches the output voltage Vref1 from the reference voltage source 8. On the other hand, for the down voltage DC-DC converter 92, the output voltage Vref2 from the reference voltage source 9 is set to a value higher than an operable lower limit voltage so that a normal operation will be performed also during the burst mode. In a light load state (power-saving mode) in which the burst mode is activated, the voltage drop amount caused by the resistive component of a circuit element is decreased. Hence, the aforementioned operable lower limit voltage is generally lower than that in the normal operation. In consideration, it is desirable to decrease the setting value of the reference voltage source 9 as much as possible for the purpose of increasing the conversion efficiency of the DC- DC converter. Here, the output voltage to the DC-DC converter is 12 V, and only a conversion potential difference of 1 V has been ensured.

Figure 4:
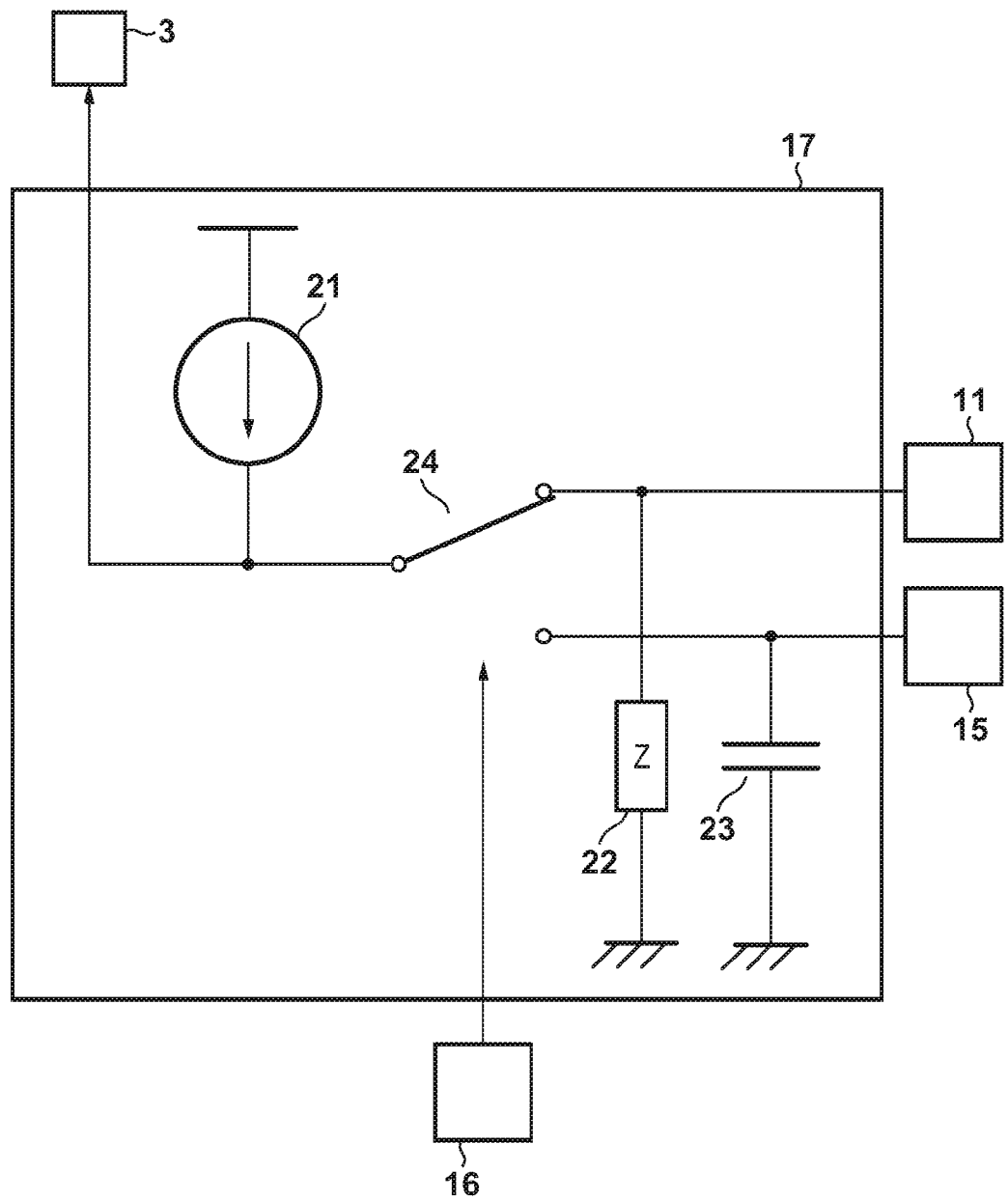
FIG. 4 is a circuit diagram showing the arrangement of a current/voltage conversion controller.

FIG. 4 is a circuit diagram showing the internal arrangement of the current/voltage conversion controller (CVCNL) 17.

As shown in FIG. 4, the current/voltage conversion controller (CVCNL) 17 includes a current source 21, an impedance element (z) 22, a capacitor 23, and a switch 24. The switch 24 receives a control signal output from the photocoupler (PC) 16 and is connected to the photocoupler (PC) 11 or the photocoupler (PC) 15. The photocoupler (PC) 11 is connected as an external current source to the impedance element (z) 22 and functions as a feedback loop phase compensator together with the current source. The photocoupler (PC) 15 is connected to the capacitor 23 as an external current source. Note that a small leak current (not shown) occurs in the capacitor 23.

For the photocoupler (PC) 11 and the photocoupler (PC) 15, the direction of the current is in a direction that removes charges from the current/voltage conversion controller (CVCNL) 17.

To show an example to help understand this, assume that the value of the current source 21 is 200 μA and the impedance element (z) 22 is formed by serial-connecting a resistor of 10K Ω and capacitor of 0.022 μF in order to form a lag-lead filter. On the other hand, assume that the capacitance of the capacitor 23 is 0.1 μF. In addition, assume that the power supply voltage from the current source 21 is 5 V and the output-side voltage from each of the photocouplers (PC) 11 and 15 is 0 V (GND). In this case, the power supply voltage from the current source 21 becomes higher than the output-side voltage from each of the photocouplers (PC) 11 and 15, and the current flows in the direction of the impedance Z element 22 or the capacitor 23 regardless of the side to which the switch 24 is connected.

When the normal mode is instructed by the photocoupler (PC) 16, the switch 24 selects the voltage to be excited in the impedance element 22 and outputs the voltage as a control voltage Vc from the current/voltage conversion controller 17. That is, the switch 24 is connected to the side of the photocoupler (PC) 11. On the other hand, when the burst mode is instructed, the voltage to be excited in the capacitor 23 is selected and output. That is, the switch 24 is connected to the side of the photocoupler (PC) 15.

In the normal mode, the current difference of the current source 21 and the photocoupler 11 flows to the impedance element 22, and a voltage corresponding to this current is excited in the impedance element (z) 22. The operation at this time is performed in an analog manner, and a voltage dependent on (convolution calculation) the temporal change of the output current from the photocoupler 11 and the impulse response characteristics of the impedance element (z) 22 is generated. The output current value of the photocoupler 15 is set to be sufficiently larger than the current value of the current source 21 and acts digitally. That is, when the photocoupler 15 is kept off, the voltage of the capacitor 23 rises at a predetermined rate by charging from the current source 21. If the photocoupler 15 is still kept off, the voltage is saturated at an output of 5 V in the end. If the photocoupler 15 is turned on, the charges of the capacitor 23 are rapidly removed, and the voltage of the capacitor 23 is lowered to 0 V in a short time. In the normal mode, the voltage of the capacitor 23 is lowered to 0 V due to discharge by the leak current (not shown).

<Description of Operation of Power Supply Apparatus (FIG. 3)>

(1) Operation in Normal Mode

In the normal mode, the switch 24 of the current/voltage conversion controller 17 is caused to select a feedback signal from the photocoupler 11 by the signal from the photocoupler (PC) 16, and feedback control is performed based on this. The operation principle related to analog feedback control as well as the most suitable design method represented by cyclic characteristics is well known to those skilled in the art. Hence, only descriptions of the statically determinate state of the components in an equilibrium state and the direction of the correction operation when displacement occurs will be given.

In the equilibrium state, that is, when the system is in a stable state by feedback operation, the control voltage Vc from the current/voltage conversion controller 17 stabilizes somewhere between 0.5 V for oscillating the oscillator 3 at a maximum frequency and 5 V for oscillating the oscillator 3 at a minimum frequency. For the sake of descriptive convenience, assume that the control voltage Vc is, for example, 4.5 V and the oscillation frequency fosc is 37 kHz. In addition, the control voltage Vc points to the voltage between the impedance element (z) 22 and the photocoupler (PC) 11. In this case, the output current from the current source 21 and the output current (leading-in current) of the photocoupler 11 have the same value. The current applied to the impedance element (z) 22 is 0, and the voltage excited in the impedance element (z) 22 stays at 4.5 V without a change. The DC gain of the error amplifier 10 is extremely high, thereby setting the secondary side voltage 18 and the reference voltage source 8 at a same value. Note that the primary side is the input side bordering the transformer and the photocoupler and the secondary side is the output side bordering the transformer and the photocoupler.

Here, if the secondary side voltage 18 rises with respect to the output voltage Vref1 from the reference voltage source 8 for some reason such as load fluctuation or the like, the output current from the error amplifier 10 increases with respect to the aforementioned equilibrium state. The output current (leading-in current) of the photocoupler 11 increases similarly with respect to the aforementioned equilibrium state. Then, a discharge occurs from the impedance element (z) 22, and the control voltage Vc lowers from 4.5 V. The oscillation frequency fosc of the oscillator (OSC) 3 rises, and the voltage supply ability to the secondary side lowers. In this manner, whatever fluctuation may occur, feedback control works in a direction to suppress the fluctuation. As a result, the secondary side voltage 18 stabilizes with respect to the reference voltage source 8 as the target value.

(2) Operation in Burst Mode

In the burst mode, the switch 24 of the current/voltage conversion controller 17 selects the feedback signal from the photocoupler 15 in accordance with the signal from the photocoupler 16, and feedback control that is based on the selected feedback signal is performed.

Here, the initial state immediately after switching from the normal mode to the burst mode is assumed to be as follows. That is, the voltage from the capacitor 23 is 0 V, the latch circuit (LAT) 14 holds a high-level state, and the secondary side voltage 18 has approximately the same value as the output voltage from the reference voltage source 8. Other cases of the initial state will be described later. In any of the cases, it quickly ends up with the repetitive operation to be described below.

If the power supply apparatus 91 switches from the normal mode to the burst mode, the switch 24 selects the output from the capacitor 23, and the control voltage Vc from the current/voltage conversion controller 17 becomes 0 V. Accordingly, the oscillator 3 stops the oscillation operation. As a result, power supply to the secondary side is stopped, and only the charges of the secondary side capacitor 7 are used as the load current. Along with the reduction in the charge amount of the secondary side capacitor 7, the secondary side voltage 18 gradually lowers. Since the latch circuit (LAT) 14 holds a high-level state during this period, the voltage from the capacitor 23 is held at 0 V by the discharge operation of the photocoupler 15.

When the discharge of the secondary side capacitor 7 continues and the voltage of the secondary side voltage 18 lowers below the output voltage Vref2 from the reference voltage source 9, the output signal from the comparator 13 changes to low level, the latch circuit (LAT) 14 is reset, and the latch circuit 14 switches to a low-level output. Then, the output current from the photocoupler 15 becomes 0, and the charging of the capacitor 23 is started by the current source 21. The voltage, that is, the control voltage Vc from the capacitor 23 gradually rises from 0 V. Note that the control voltage Vc points to the voltage between the capacitor 23 and the photocoupler (PC) 15.

When the control voltage Vc reaches 0.5 V, the oscillator 3 starts to oscillate at the maximum frequency fmax of 333 kHz. Due to this oscillation frequency, the voltage excited on the secondary side of the transformer 5 is set at a sufficiently small value with respect to the output voltage Vref2 from the reference voltage source 9. The control voltage Vc further rises, and for example, when it reaches 2 V, the oscillation frequency of the oscillator 3 decreases, for example, to 83 kHz. The voltage excited on the secondary side of the transformer 5 by this oscillation frequency changes to a voltage that exceeds the output voltage from the reference voltage source 9, and charging of the secondary side capacitor 7 is performed via the secondary side rectifier 6. While the secondary side voltage 18 continues to rise due to the charging of the secondary side capacitor 7, the control voltage Vc also continues to rise. As a result, since the oscillation frequency of the oscillator 3 continues to decrease and the voltage excited on the secondary side of the transformer 5 gradually rises, the secondary side voltage 18 continues to rise synchronously.

In this manner, at the point when the secondary side voltage 18 becomes approximately equal to the output voltage from the reference voltage source 8, the control voltage Vc is 4.5 V, and the oscillation frequency is approximately equal to the normal mode equilibrium state of 37 kHz.

The secondary side voltage 18 further continues to rise and the moment the secondary side voltage 18 exceeds the output voltage from the reference voltage source 8, the output signal from the comparator 12 changes to high level, the latch circuit (LAT) 14 is reset, and the latch circuit 14 switches to a high-level output. Then, the charges of the capacitor 23 are rapidly removed by the discharge operation of the photocoupler 15, and the control voltage Vc changes to 0 V, thereby causing the oscillator 3 to stop the oscillation operation. This indicates that the process has returned to the initial state at the beginning of this description, and the above-described operations are repeated.

Due to the action of the current source 21 and the capacitor 23, the control voltage in the burst mode has a predetermined rise rate according to the following description.

This rise rate is set to a moderate value so that the oscillation frequency of the oscillator 3 decreases along with the rise of the control voltage Vc to cause the voltage which is excited on the secondary side of the transformer 5 to rise and to a degree that can be followed by the secondary side voltage 18. This is because if the control voltage Vc is caused to abruptly rise, it becomes a state of overdrive as the current resonance method and places excessive stress on each element forming the power supply apparatus. Also, an overshoot may occur in the output since the detection of the secondary side voltage 18 cannot catch up. However, it is desirable for the rise rate to be rapid if it is to be in accordance with the objective of the invention of lowering the rate of the oscillation operation period with respect to the burst period. Hence, a suitable rise rate that considers both these aspects will be designed in this embodiment.

A design example is shown as follows in order to facilitate the understanding of the embodiment. Parts of the description are the same as those that have already been described above. Although this will be repetitive, it should be understood that the purpose of the design values is to further facilitate the understanding of the operations of the present invention, and the design values do not to limit the present invention.

That is, the output voltage Vref1 from the reference voltage source 8 is 30 V, the output voltage Vref2 from the reference voltage source 9 is 13 V, the current value of the current source 21 is 200 μA, and the capacitance of the capacitor 23 is 0.1 μF. The oscillation frequency fosc of the oscillator 3 is 167 kHz when the control voltage Vc at 1 V, 83 kHz at 2 V, and 56 kHz at 3 V, and 42 kHz at 4 V. The rise rate of the control voltage Vc during the burst mode is 2V/ms.

Note that in this embodiment, as described with reference to FIGS. 3 and 4, the oscillator 3 is controlled without the error amplifier (AMP) 10 in the burst mode. As a result, it becomes possible to increase the voltage fluctuation width of the secondary side compared to the conventional art. By increasing the voltage fluctuation width compared to the conventional art, the oscillation operation count per unit time can be decreased compared to the conventional art.

(3) Operation from Other Different Initial States

Case in which Latch Circuit 14 in Initial State Outputs Low Level Signal

Depending on the difference between the offset voltage of the error amplifier 10 and the offset voltage of the comparator 12, the initial state of the latch circuit 14 immediately after switching from the normal mode to the burst mode may be a low-level output. In this case, the operation differs from the aforementioned description. Charging of the capacitor 23 is started immediately after switching to the burst mode, and the secondary side voltage 18 rises before it lowers to the level of the output voltage Vref2 from the reference voltage source 9. Note that the operation after the output signal from the comparator 12 exceeds the output voltage Vref1 from the reference voltage source 8 and changes to high level is the same as the aforementioned description.

Operation when Initial AC Voltage is Input to Power Supply Apparatus

As previously described, if no other power supply source is present other than the power supply apparatus on the secondary side, since the photocoupler 16 inevitably cannot be excited, the process starts automatically from the burst mode, that is, in a state in which the photocoupler 15 is selected in this arrangement. In this initial state, the charges of the respective secondary side capacitor 7 and the capacitor 23 are 0, and accordingly the control voltages Vc of the current/voltage conversion controller 17 and the respective secondary side voltage 18 are 0. The outputs from the respective comparator 13 and latch circuit 14 are low level, and the photocoupler 15 is in an off state and its output current is 0.

Starting from this initial state, charging of the capacitor 23 is started by the current source 21, and the control voltage Vc gradually rises from 0 V as a result. When the control voltage Vc reaches 0.5 V, the oscillator 3 starts to oscillate at the maximum frequency fmax of 333 kHz. Although the voltage excited on the secondary side of the transformer 5 by this oscillation frequency has a sufficiently small value with respect to the output voltage from the reference voltage source 9, the initial value of the voltage from the secondary side capacitor 7 is 0 V. Hence, charging via the secondary side rectifier 6 is immediately started, and the secondary side voltage 18 rises from 0 V as a result.

The control voltage Vc gradually rises. For example, when the control voltage reaches 2 V, the oscillation frequency of the oscillator 3 decreases to, for example, 83 kHz. At this oscillation frequency, the voltage excited on the secondary side of the transformer 5 becomes a voltage that exceeds the output voltage from the reference voltage source 9, the charging of the secondary side capacitor 7 via the secondary side rectifier 6 advances to approximately the same value of voltage as the output voltage from the reference voltage source 9. The subsequent operation is the same as that in the aforementioned description.

Case in which Discharge of Capacitor 23 is Insufficient (For Example, Maintained at Voltage of 2.5 V) and Latch Circuit 14 Outputs Low-Level Signal If the mode switches to the normal mode when the capacitor 23 is charging in the burst mode and the mode switches back to the burst mode in a short period of time, the following initial state occurs. That is, it is a state in which the discharge of the capacitor 23 is insufficient and maintained at, for example, a voltage of 2.5 V, and the latch circuit 14 outputs a low-level signal. If the burst mode is started in this initial state, the control voltage Vc becomes 2.5 V, and the oscillator 3 starts oscillating at an oscillation frequency of 67 kHz. A voltage corresponding to this oscillation frequency is accordingly excited on the secondary side of the transformer 5, but this voltage is lower than the output voltage from the reference voltage source 8. In the normal mode, since the secondary side capacitor 7 has a voltage value approximately equal to the output voltage from the reference voltage source 8, the charging does not start. The discharge of the secondary side capacitor 7 is performed by a load current, and the secondary side voltage 18 gradually becomes reduced than the output voltage from the reference voltage source 8. On the other hand, since the capacitor 23 is simultaneously charged by the current source 21, the control voltage Vc gradually rises from 2.5 V. The secondary side voltage 18 shifts to a rise at the stage when the voltage (including Vf of the rectifying diode to be precise) excited on the secondary side of the transformer 5 accordingly exceeds the secondary side voltage 18 in the process of reduction. The subsequent operation is the same as that in the aforementioned description.

As described above, even if the burst operation is started from any of the initial states, the process returns to a repetitive operation of the burst mode or the normal mode at an early period.

During the burst mode, the secondary side voltage 18 mostly does not reach the output voltage from the reference voltage source 8. Hence, depending on the arrangement of the error amplifier 10, it can change to an internally saturated state, and the return to a normal operation point of the error amplifier 10 may be delayed when the mode shifts from the burst mode to the normal mode, and an overshoot or an element current surge may occur. Therefore, the error amplifier 10 may be forcibly set to the initial state in the burst mode by a short circuit (not shown) or the like. Alternatively, if the burst mode has been instructed as the function of the current/voltage conversion controller 17 for the same purpose, it may have an arrangement in which the impedance element 22 is short-circuited.

Figure 5:
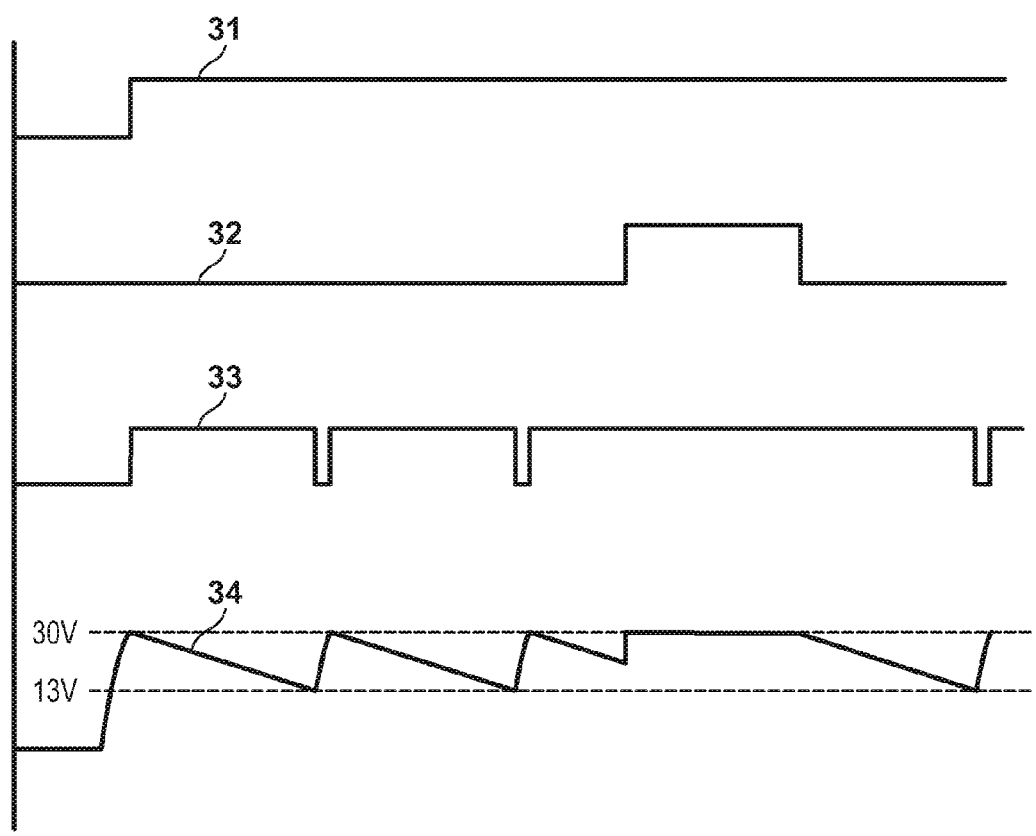
FIG. 5 is a view showing output voltage waveforms of respective units of the power supply circuit.

FIG. 5 is a view showing the wavelengths of the output voltages of the respective units of the power supply circuit. This view shows the states when the process shifts from the burst operation to the normal operation and once again back to the burst operation from the input of the AC voltage AC to the power supply apparatus.

In FIG. 5, reference numeral 31 denotes an AC voltage; 32, an output from the photocoupler 16 which indicates the burst mode or the normal mode; 33, an output from the latch circuit 14; and 34, a secondary side voltage 18. Particularly, the secondary voltage 34 shows that, as previously described, the secondary side voltage 18 hardly reaches the output voltage (Vref1=30 V) from the reference voltage source 8 during the burst mode (the output from the photocoupler 16 is at low level).

Here for a deeper understanding of the embodiment, in particular, the technique of prolonging the burst period contributing to the improvement of the efficiency of the power supply apparatus and the charging operation during the oscillation operation period will be compared with those of the conventional art.

The present invention focuses on how the burst period can be greatly prolonged by allowing the secondary side output fluctuation. As describe above, the burst period corresponds to a period obtained by dividing the product of the capacitance of the secondary side capacitor and the voltage fluctuation width by the average load current. For example, according to an embodiment of Japanese Patent No. 5179893, assume that the reference voltage Vref1 is 3.0 V, the other reference voltage Vref2 is 1.5 V, the DC gain of the feedback system is 40 dB, the capacitance of the secondary side capacitor is 2,200 μF, and the average load current is 0.05 A. In this case the burst period TB is calculated as $$TB=(3.0-1.5)/100\times2200\times10^{-6}/0.05$$

$$TB=0.66 \text{ [ms]}$$

On the other hand, the oscillation operation period tB during the burst operation assuming, as its measure, that it is approximately 20 times the oscillation frequency fosc, can be calculated here as $$tB=20\times10^{-6}\times20$$

$$tB=0.4 \text{ [ms]}$$

where the oscillation frequency fosc is 50 kHz.

Taking a look at this calculation result, it is difficult to say, according to the conventional art, that the time ratio of the oscillation operation period with respect to the burst period is sufficiently small.

In contrast, according to the embodiment of the present invention, the burst period can be calculated as $$TB=(30-13)\times2200\times10^{-6}/0.05$$

$$TB=748 \text{ [ms]}$$

Even though this calculation result and the calculation result according to the conventional art are compared and an increase in the average current due to an average output voltage drop is considered, it is understandable that the burst period can be prolonged greatly according to this embodiment.

<Description of Charging Action During Oscillation Operation Period in Burst Operation (FIGS. 6 and 7)>

Figure 6:
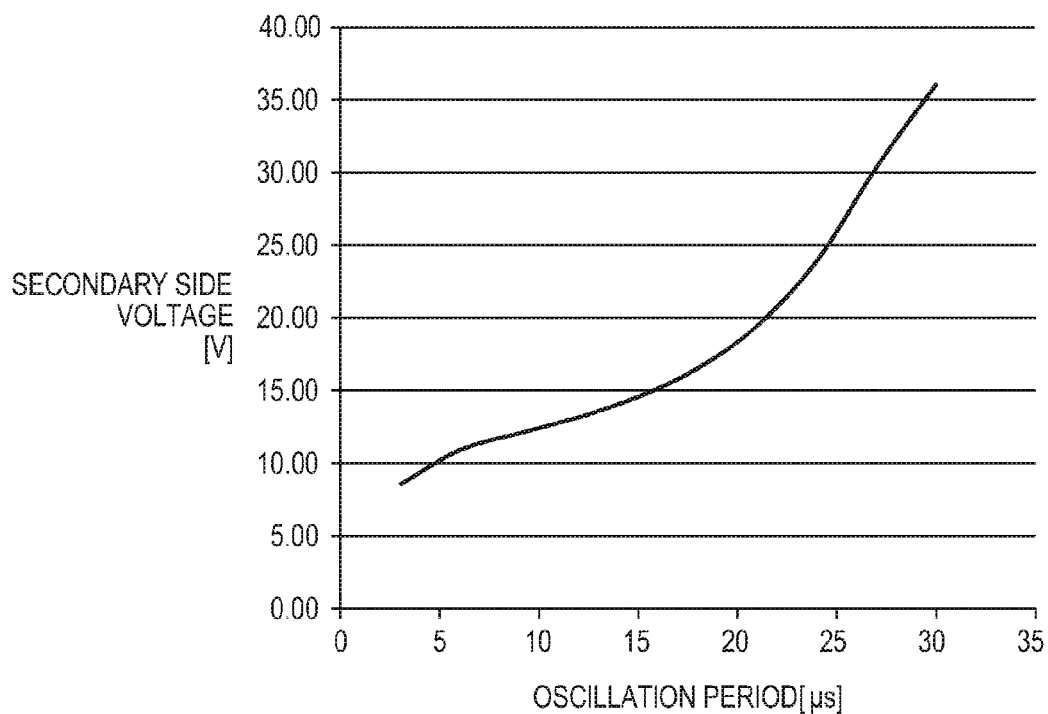
FIG. 6 is a chart showing the relationship between an oscillation period of a current resonance switching power source and a secondary side voltage.

FIG. 6 is a chart showing the relationship between the oscillation period of the current resonance switching power source and the secondary side voltage.

In the current resonance type (LLC method), the transfer characteristic (gain) from the primary side to the secondary side is often indicated by its relationship with the oscillation frequency. However, it should be noted that the abscissa is set as the oscillation period in FIG. 6. Also, in the example shown in FIG. 6, the primary side input DC voltage of the transformer 5 is assumed to be 140 V and detailed design values matching the above description are shown. However, they are intended to increase the easy understanding of the embodiment and do not limit the present invention.

As shown in FIG. 6, the secondary side output voltage increases in accordance with the prolonging of the oscillation period. The characteristic of the secondary side output voltage is not linear but has a monotonically increase characteristic. The secondary side voltage is approximately 13 V when the oscillation period is at 12 μs, the secondary side voltage is approximately 16 V when the oscillation period is at 18 μs, and the secondary side voltage is approximately 30 V when the oscillation period is at 27 μs.

Since the oscillator (OSC) 3 can be easily packaged into an integrated circuit, it is formed using a waveform generator which is generally formed from a constant-current source and a capacitor, a comparator which compares the voltage of this waveform generator and the oscillation control voltage, a toggle flip flop which uses the output from this comparator as a trigger, and the like. In a case where this arrangement is employed, an oscillation period proportional to the control voltage Vc is obtained.

Figure 7:
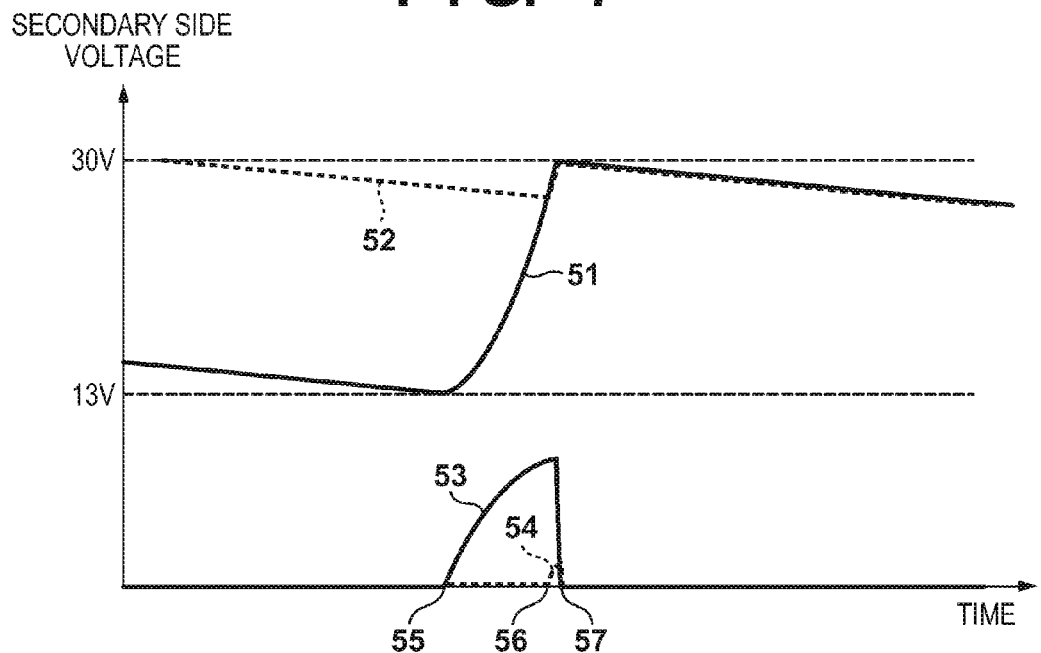
FIG. 7 is a chart showing waveforms in the burst mode.

FIG. 7 is a chart showing the secondary side voltage and the charging current to the secondary side capacitor in a case where the oscillator 3 is employed. In FIG. 7, the abscissa indicates the lapse time. For the sake of comparison between the conventional art and the embodiment of the present invention, the characteristics have been illustrated by being overlaid on each other. Additionally, the time axes of the voltage waveform and the current waveform have been aligned. That is, the reference numeral 51 denotes the secondary side voltage according to the embodiment of the present invention; 52, the output voltage according to the conventional art; 53, the charging current according to the embodiment of the present invention; and 54, the charging current according to the conventional art. The reference numeral 55 denotes the charging start timing according to the embodiment of the present invention; 56, the charging start timing according to the conventional art; and 57, the charging end timing of both the embodiment and the conventional art.

Here, paying attention to the leading edge of the secondary side voltage 51, it should be noted that the since, as previously described, the time and period have a linear relationship, it becomes a waveform obtained by replacing the abscissa of FIG. 6 with time and limiting the ordinate with the voltages of the respective charging start times and the charging stop time. As is evident from FIG. 7, in this embodiment, the charging operation continues from a state in which the secondary side voltage is between 13 V to 30 V, and the current value is also large. That is, the time until the secondary side voltage reaches the lower limit value (13 V) from the upper limit value (30 V) can be prolonged. As a result, the oscillation count is decreased compared to the conventional art. Further reduction of power consumption can be implemented by decreasing the oscillation count. On the other hand, according to the conventional art, charging operation is only performed when the secondary side voltage is near 30 V, and its current value is small. That is, the time until the secondary side voltage reaches the lower limit value from the upper limit value (30 V) cannot be prolonged. As a result, the oscillation count increases compared to this embodiment.

In addition, according to this embodiment, although a circuit which prolongs the burst period by increasing the capacitance of the secondary side capacitor may be considered, such a circuit arrangement is unnecessary. Hence, even if the power supply apparatus is used in a printing apparatus that can be called a large-format printer, large power supply can be implemented with a small-size power supply apparatus. This can contribute to space saving and cost reduction of the printing apparatus.

Note that, FIG. 12 shows an example in which the oscillation count per unit time according to this embodiment becomes less than the oscillation count per unit time according to the conventional art. In FIG. 12, it is evident from the output voltage 52 that three oscillation operations have already been executed in the conventional art before the secondary side voltage 51 according to the embodiment has reached the lower limit value after reaching the upper limit value in one oscillation operation.

As is evident from the above-description, in the arrangement according to this embodiment, the same oscillation operation period is efficiently used so as to perform a large amount of charging.

For example, in a case where the power supply apparatus conforms to a universal power supply, the fact that the primary side input DC voltage of the transformer 5 may become 336 V needs to be considered. Since the secondary side voltage can be obtained in proportion to the input voltage at a same oscillation frequency, to obtain the same secondary side voltage output, it is necessary to reduce the control voltage Vc and raise the oscillation frequency (shorten the oscillation period). In other words, in a universal power supply, the rise rate of the control voltage is required to have a favorable soft start characteristic over these wide ranges of voltages, and this can be a constraint in terms of designing a short soft start time.

In addition, when the input DC voltage is 336 V, a voltage of approximately 20 V has already been excited on the secondary side of the transformer 5 at the start of oscillation. Hence, it becomes necessary to be aware of an overdrive state which had no influence in the case of the conventional art. However, even if the rise rate of the control voltage Vc is lowered for this purpose, it does not influence, in relation to the burst period TB, the superiority of the embodiment of the present invention over the conventional art from the viewpoint of the time ratio. Since this is only problematic in the viewpoint of element stress, this may be solved by another current limiting function.

In this embodiment, a large voltage fluctuation occurs on the secondary side during the burst mode, and a DC-DC converter for absorbing this fluctuation becomes necessary in order to use the output in the burst mode. However, along with the product advancement due to recent digital techniques, this has become less of a disadvantage. This is due to the fact that a low voltage and a large current power supply suitable for the performance of a CPU, an ASIC, a memory, and the like have become required, and the DC-DC converter has naturally come to be arranged near the load as a matter of course.

In the power supply apparatus according to the embodiment of the present invention, although voltage fluctuation during discharge is slow, a rapid voltage fluctuation occurs in accordance with the rise rate of the control voltage Vc at charging time. However, if a bottom detection or current feedback DC-DC converter is employed, the output fluctuation suppression effect to the input voltage fluctuation is high, and no difficulty is caused in terms of design. Furthermore, if the rise rate of the control voltage is designed to slow down at a considerable amount, the output voltage fluctuation width can fall within a desired range even if a conventional voltage controlled DC-DC converter is used. In this manner, the fact of slowing down the rise rate of the control voltage Vc leads the oscillation operation period to be prolonged. However, since the burst period is very long as previously described, this barely influences the superiority, in the viewpoint of the time ratio, of the embodiment of the present invention against the conventional art.

<Operation of Printing Apparatus (FIG. 8)>

In conclusion of this embodiment, the operation of a printing apparatus which uses the above-described power supply apparatus will be described with reference to a flowchart.

Figure 8:
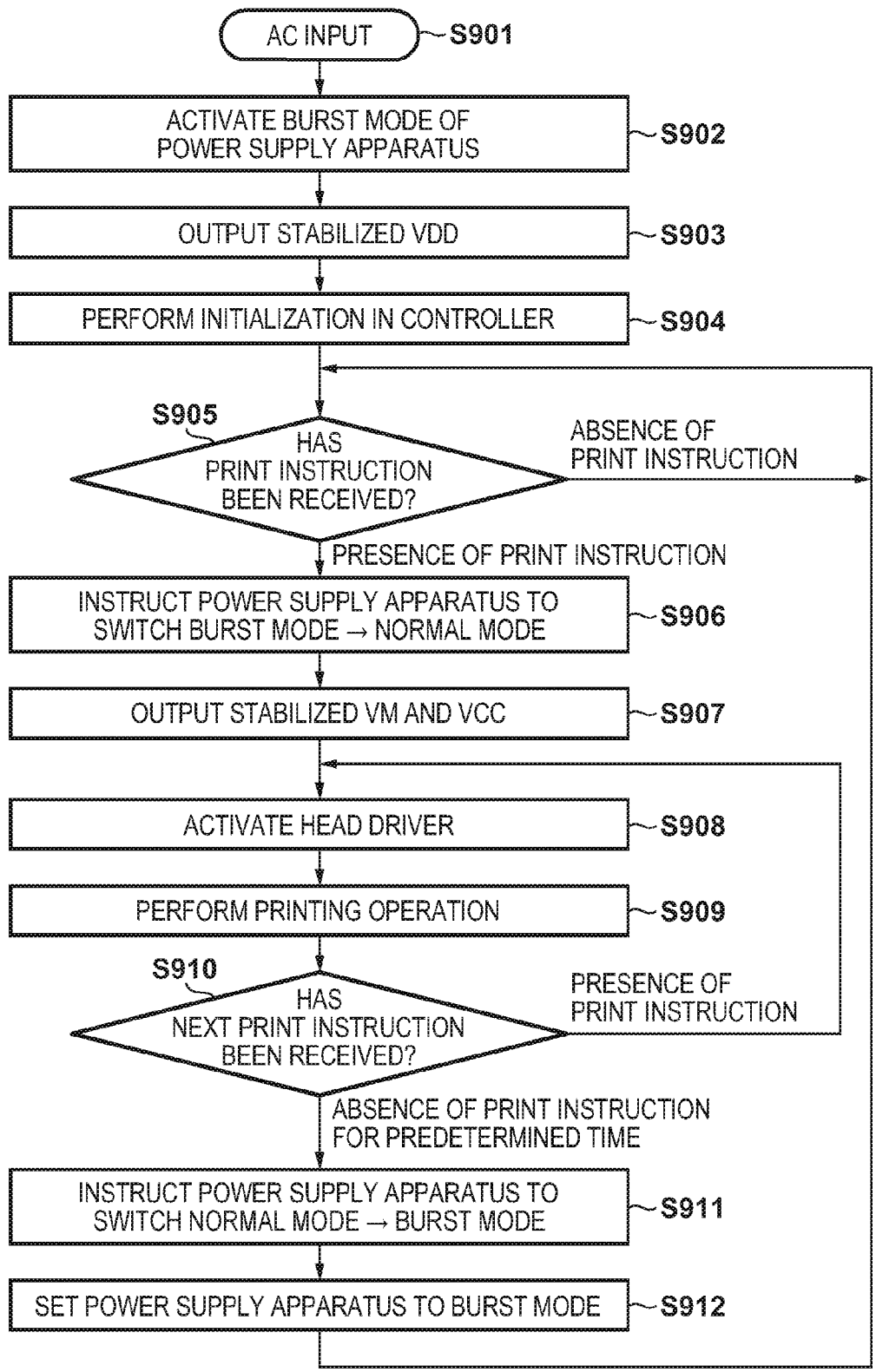
FIG. 8 is a flowchart showing an operation of the printing apparatus from the start of an alternating power supply input.

FIG. 8 is a flowchart showing the operation of the printing apparatus from the start of power on of an alternating power supply.

Upon input of the AC voltage AC in step S901, the power supply apparatus 91 is activated in the burst mode in step S902, and the high voltage VM and the low voltage VCC that change in synchronization with the burst period are output.

In step S903, the voltage VDD stabilized by the down voltage DC-DC converter 92 is output. Next, in step S904, the controller 93 is activated upon application of the voltage VDD, and initialization is performed in the controller. In step S905, the controller 93 waits to receive a print instruction. Upon receiving the print instruction, the process advances to step S906, and the controller 93 issues the switching signal 98 to the power supply apparatus 91 and makes an instruction to switch the operation from the burst mode to the normal mode. As a result, the power supply apparatus 91 turns on the integrated PCF and switches the operation to the normal mode operation.

In step S907, stable high voltage VM and low voltage VCC free from fluctuations are output. After a predetermined wait time for voltage stabilization has passed, the controller 93 activates the head driver 96 in step S908. In step S909, the controller 93 executes the printing operation by driving the motor 95 while suitably outputting the control signal to the motor driver 94. In this period, the head driver 96 outputs the discharge control signal to the printhead 97, and the printhead 97 performs printing by discharging ink. Accordingly, power using the high voltage VM is consumed.

When the printing operation ends, the process advances to step S910, and the controller waits to receive the next print instruction for a predetermined time. Here, if the next print instruction is not input during the predetermined time, the process advances to step S911, and the controller 93 issues the switching signal 98 to the power supply apparatus 91 and makes an instruction to switch the operation of the power supply apparatus 91 from the normal mode to the burst mode. In step S912, in accordance with the instruction issued in step S911, the power supply apparatus 91 stops the integrated PFC and switches its own operation to the burst mode. Subsequently, the process returns to step S905 and waits to receive a print instruction. Note that if the power supply of the printing apparatus is turned off while waiting to receive a print instruction in step S905, the processing of this flowchart ends.

In contrast, in step S910, if the next print instruction is input, the process returns to step S908, and the printing operation is continued.

A converter for outputting the high voltage VM and a converter for outputting the low voltage VCC have been separately provided in a conventional large-format printer in order to satisfy the power-saving characteristics in the power-saving mode. The former converter has employed the forward method which is capable of large outputs and the latter converter has employed the fly back method which is highly efficient in a light load.

In contrast, according to the above-described embodiment, both large power supply capability and high-efficiency in a light load required by the large-format printer can be satisfied by a single converter by employing the current resonance power supply apparatus. Hence, it becomes possible to implement large cost reduction and down-sizing of the power supply apparatus.

[Second Embodiment]

Figure 9:
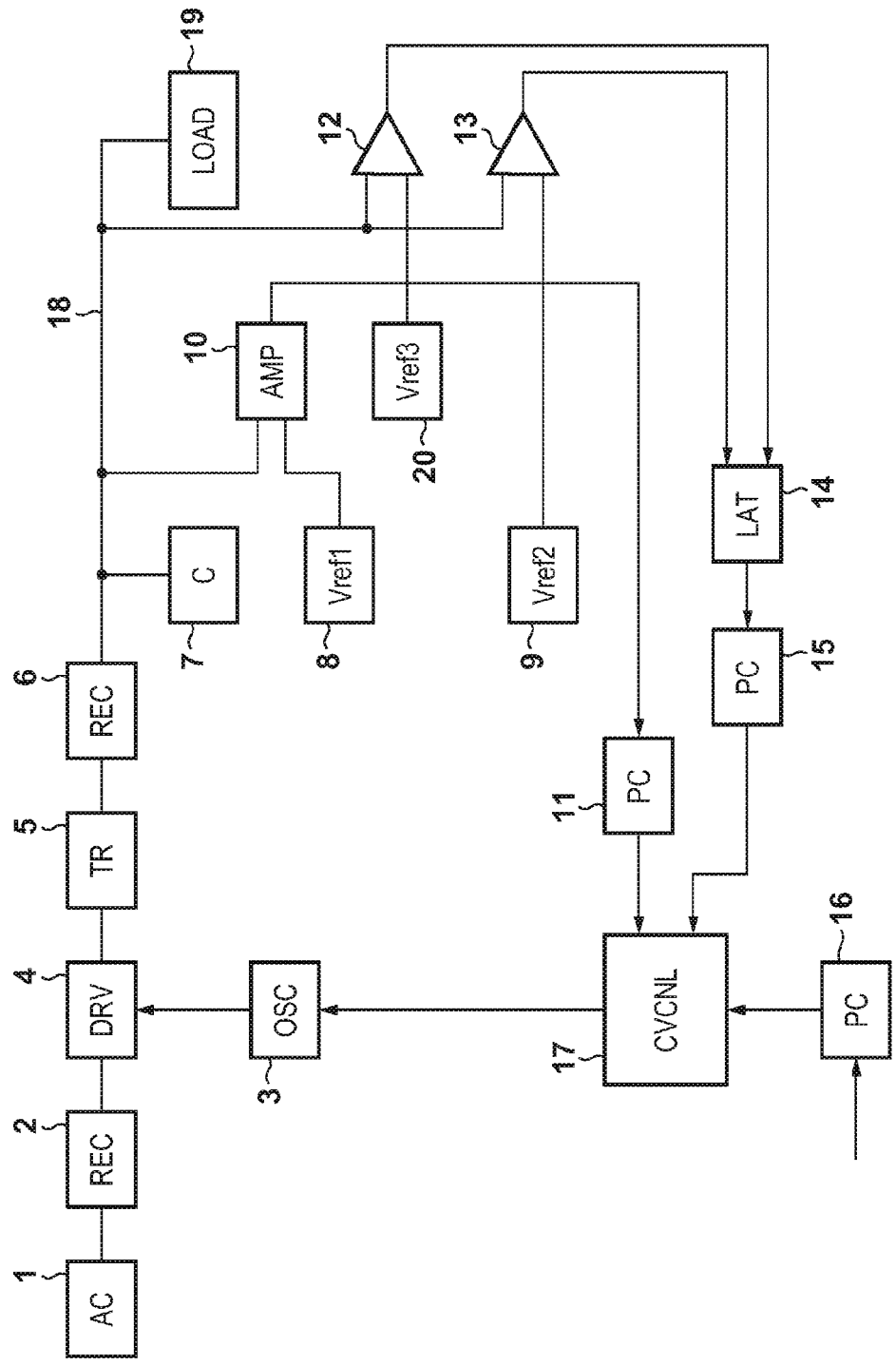
FIG. 9 is a block diagram showing the arrangement of a power supply apparatus according to the second embodiment.

FIG. 9 is a block diagram showing the arrangement of a power supply apparatus 91 according to the second embodiment. Note that the same reference numerals as those already described in the first embodiment with reference to FIG. 3 denote the same constituent elements in FIG. 9, and a description thereof is omitted. Here, only arrangements and operations unique to this embodiment will be described, and the remaining points are the same as the first embodiment.

Comparing FIG. 9 and FIG. 3, this embodiment is, in addition to the arrangement shown in FIG. 3, provided with another reference voltage source 20, and a reference voltage source 8 for an error amplifier 10 and the reference voltage source 20 for a comparator 12 are separated. An output voltage Vref3 of the reference voltage source 20 is set lower than an output voltage Vref1 from the reference voltage source 8 but is set higher than an output voltage Vref2 from a reference voltage source 9. That is, the three reference voltages have a relationship of Vref2<Vref3<Vref1. In this embodiment, Vref1=30 V, Vref2=13 V, and Vref3=22 V.

The burst mode is different from that of the first embodiment due to this arrangement. A secondary side voltage Vs 18 repeatedly fluctuates between the output voltage Vref3 from the reference voltage source 20 and the output voltage Vref2 from the reference voltage source 9, that is, in the range of Vref2 (13 V)<Vs<Vref3 (22 V). By this arrangement, the average output voltage in the burst mode lowers from (30+13)/2=21.5 V of the first embodiment to (22+13)/2=17.5 V in this embodiment. On the other hand, the burst period TB becomes shorter than that in the first embodiment, but this has no negative influence on efficiency (as will be described later).

According to this embodiment, since the average output voltage in the burst mode lowers as described above, the conversion efficiency of a subsequent stage DC-DC converter improves, and it has been confirmed that the power consumption in the burst mode can be reduced for the entire power supply apparatus. This is not because of the loss increase caused by the reduction in the output voltage from a current resonance switching power source, for example, the loss increase due to an increase of the average current on the secondary side rectifying diode, but rather considered to be a result of the efficiency improvement in the DC-DC converter exceeding this loss decrease.

Furthermore, the following advantage can be achieved if the power supply apparatus is arranged in combination with a PFC (Power Factor Correction) circuit. When a printing apparatus operates in the power saving mode, the PFC is tends to be stopped. When the AC input voltage is reduced because the PFC is stopped in the power saving mode from a state in which a high DC voltage had been obtained by the PFC, it becomes necessary to obtain a necessary secondary side voltage by decreasing the oscillation frequency of the oscillator and raising the voltage conversion ratio. However, it is not easy to use a low oscillation frequency region from the viewpoints of conversion efficiency, stability, and element stress such as off-resonance. On the other hand, if the target voltage is lowered as in this embodiment, the amount by which the oscillation frequency is lowered can be limited, and the aforementioned difficulties are avoided.

Note that in this embodiment, another reference voltage source has been added to the power supply apparatus compared to that of the first embodiment. However, while the error amplifier 10 is generally formed by a shunt regulator that incorporates a reference power source and has high cost-performance, the reference voltage source 20 does not require accuracy and can be implemented by a low-cost zener diode. Hence, there is no disadvantage in terms of design.

[Third Embodiment]

Figure 10:
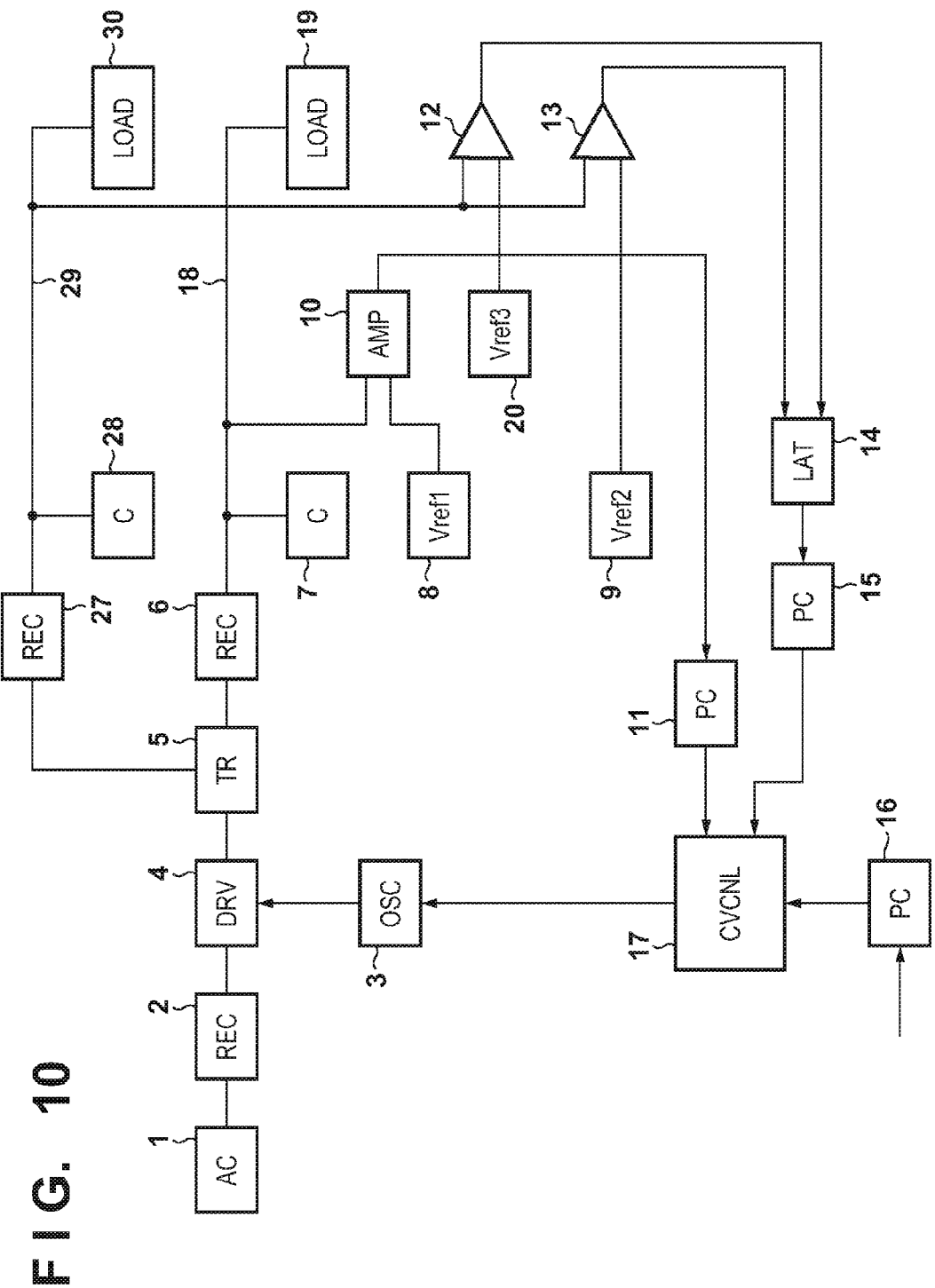
FIG. 10 is a block diagram showing the arrangement of a power supply apparatus according to the third embodiment.

FIG. 10 is block diagram showing the arrangement of a power supply apparatus according to the third embodiment. Note that the same reference numerals as those already described in the first and second embodiments with reference to FIGS. 3 and 9 denote the same constituent elements in FIG. 10, and a description thereof is omitted. Here, only arrangements and operations unique to this embodiment will be described, and the remaining points are the same as the first and second embodiments.

Comparing FIG. 10 and FIG. 9, this embodiment has, in addition to the arrangement shown in FIG. 9, an arrangement in which a secondary side rectifier 27 and a secondary side capacitor 28 are connected to the subsequent stage of a transformer 5 and a secondary side voltage 29 is output. In addition, another load 30 is connected to the output secondary side voltage 29. The arrangement of this embodiment differs from that of the second embodiment in that the transformer 5 outputs two secondary side voltages 18 and 29, an error amplifier 10 is connected to the output of the secondary side voltage 18, and comparators 12 and 13 are connected to the output of the secondary side voltage 29.

Here, the secondary side voltages 18 and 29 have a ratio of 3:1. That is, when the output from the secondary side voltage 18 is 30 V, the output from the secondary side voltage 29 is approximately 10 V. Assume that an output voltage Vref1 from a reference voltage source 8 is 30 V, an output voltage Vref2 from a reference voltage source 9 is 6 V, and an output voltage Vref3 from a reference voltage source 20 is 8 V. A motor 95, a motor driver 94, and a printhead 97 are assumed be a load 19, and a down voltage DC-DC converter 92 which supplies a power supply to a logic circuit is assumed to be the load 30.

By including such an arrangement, the secondary side voltage 18 is controlled to be set at the output voltage Vref1 from the reference voltage source 8, that is, 30 V when a power supply apparatus 91 is in the normal mode. At this time, approximately 10 V of the secondary side voltage 29 is output.

On the other hand, when the power supply apparatus 91 is in the burst mode, the secondary side voltage 29 repeatedly fluctuates between the output voltage Vref3 from the reference voltage source 20 and the output voltage Vref2 from the reference voltage source 9, that is, between 8 V and 6 V. Note that although it is calculated that the secondary side voltage 18 at this time will fluctuate between 24 V and 18 V, it is expected that the load 19 will become greatly lighter during the burst operation. In such a case, the secondary side voltage 18 is maintained at 30 V which is the voltage before entering the burst mode operation by the voltage holding operation of the secondary side capacitor 7 or maintained at 24 V which is the peak voltage during the burst mode operation.

The effects of the third embodiment that can be obtained by these arrangement and operation will be described next.

In this embodiment, since two high and low secondary side voltage outputs are obtainable from the transformer 5, voltages suitable for, for example, a load requiring a high voltage such as a motor and a load requiring a comparatively low voltage from the points of conversion efficiency and element withstand voltage can be respectively supplied by a single converter. In this arrangement, it is desirable to employ a current resonance switching converter which excels at cross regulation as that included in this embodiment.

What is required in a normal mode operation is the voltage accuracy of the secondary side voltage 18. Although the embodiment excels at cross regulation, the secondary side voltage 29 fluctuates in accordance with the load 30 when the secondary side voltage 18 has been stabilized. However, this degree of fluctuation is absorbed by the down voltage DC-DC converter assumed to be the load 30 and does not pose a problem at all.

On the other hand, when the printing apparatus is operating in the power-saving mode, a burst mode operation based on the secondary side voltage 29 is excited. However, at this time, since the secondary side voltage 18 is not used for the printing apparatus, voltage fluctuation is tolerable within a range that does not exceed the predetermined voltage. Here, the range is set to be lower than a value obtained such that the output voltage Vref3 from the reference voltage source 20 converts the output voltage Vref1 from the reference voltage source 8 by the ratio of two secondary side voltages. Hence, even if cross-regulation is degraded, the secondary side voltage 18 will not exceed the voltage (30 V) in the normal mode operation.

<Modified Example>

Although it is suitable to use the two-output current resonance switching power source for the printing apparatus of the present invention in this manner, problems which may occur due to the two-output arrangement and the solutions thereof will be finally described as a modification example of this third embodiment.

Problem 1 (Rapid Change of Load 19 from Heavy State to Light State in Normal Mode)

In this case, since the voltage drop amount on the secondary side rectifier 6 rapidly decreases, a slight overshoot occurs on the secondary side voltage 18. As a result, by the operation of the error amplifier 10, the oscillator 3 greatly increases the oscillation frequency fosc or stops the oscillation operation. If this state continues due to the voltage holding operation of the secondary side capacitor 7, the secondary side voltage 29 may fall below the predetermined required voltage. As a measure against this phenomenon, for example, it may be arranged so that the outputs from the respective comparators 12 and 13 are used in the normal mode and the photocoupler 11 is forcibly turned off when the output signals of these comparators changes to low level. The output from the comparator 12 can be used for this purpose because its target value has been set to be lower than a value obtained from converting that of a normal state, as previously described. In this manner, if the outputs from the respective comparators 12 and 13 are used, the above-described problem can be solved at a low cost without providing a separate voltage detection circuit.

Problem 2 (Rise Rate of Oscillation Control Voltage in Burst Mode)

If the rise rate is insufficiently limited, even if the secondary side voltage 29 falls within a predefined voltage range without an overshoot, the secondary side voltage 18 may overshoot. Although designing the arrangement so that the rise rate of the oscillation control voltage will be suppressed to a low rate is the primary consideration, for example, it may have an arrangement that forcibly sets the latch circuit LAT 14 by using the output from the error amplifier 10 in order to solve this problem.

The output from the error amplifier 10 can be used for this purpose because, as previously described, the secondary side voltage 18 which is assumed for the burst mode operation is designed to have a low value compared to the value in the normal mode. If the output from the error amplifier 10 is used, the above-described problem can be solved at a low cost without providing a separate voltage detection circuit.

Figure 11:
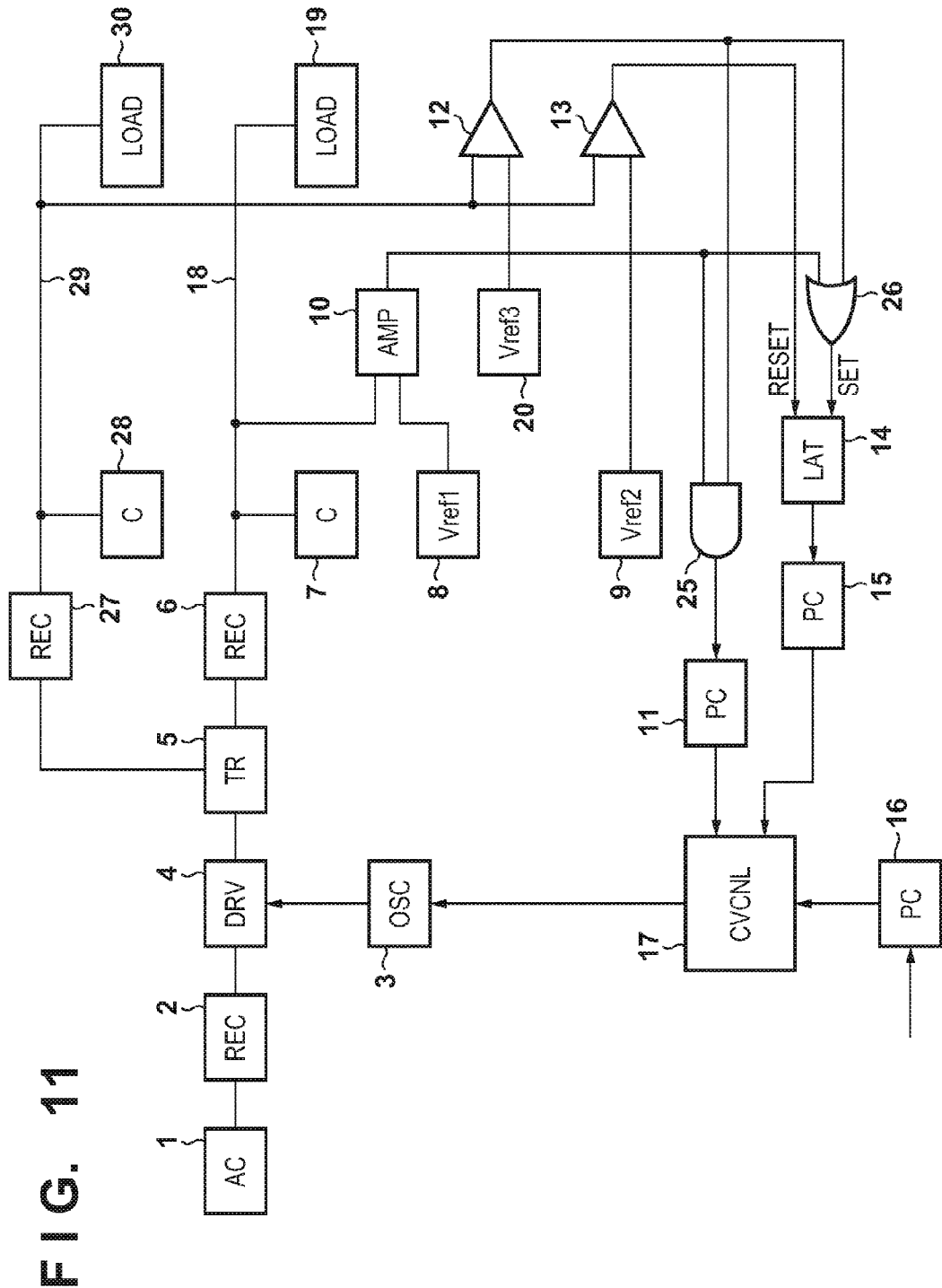
FIG. 11 is a block diagram showing the arrangement of the power supply apparatus according to a modified example of the third embodiment.

FIG. 11 is a block diagram showing the arrangement of the power supply apparatus 91 according to the modified example of the third embodiment formed to solve the aforementioned two problems. This arrangement employs an arrangement that uses the output from the comparator 12 and the output from the error amplifier 10.

Note that the same reference numerals as those already described with reference to FIG. 10 denote the same arrangements in FIG. 11, and a description thereof is omitted.

As shown in FIG. 11, in the modified example, an AND circuit 25 is provided in the preceding stage of the photocoupler 11 and receives the outputs from the error amplifier 10 and the comparator 12. When the output signal from the comparator 12 is high level, the AND circuit 25 allows the output from the error amplifier 10 to directly pass, and when the output signal from the comparator 12 is low level, the output is turned off and causes the output current from the photocoupler 11 to be "zero". In addition, in this modified example, an OR circuit 26 is included in the preceding stage of the latch circuit 14 and receives the outputs from the error amplifier 10 and the comparator 12. When the output signal from the comparator 12 is high level or the output from the error amplifier 10 is high level, the OR circuit 26 outputs a high-level signal and sets the latch circuit 14.

As described above, according to this modified example, the aforementioned two problems are solved at a low cost without having to provide a separate voltage detection circuit.

Note that an example in which a power supply apparatus is implemented in a printing apparatus has been described in each aforementioned embodiment. However, the present invention is not limited to this. The present invention is applicable to a case in which this power supply apparatus is implemented in an electronic device, for example, a liquid crystal television, that demands very high voltage conversion efficiency in the power-saving mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-196973, filed Oct. 2, 2015, which is hereby incorporated by reference herein in its entirety.

What is claimed is:

1. A power supply apparatus that includes a current resonance switching power source and operates in one of a first mode and a second mode, comprising:
   a transformer, including a current resonance circuit, configured to output, to a secondary side, a voltage different from a voltage received on a primary side;
   an oscillator configured to perform an oscillation operation to the transformer;
   a capacitor configured to smooth the voltage output by the transformer;
   an amplifier configured to output a different current in accordance with a difference between a first reference voltage and an output voltage smoothed by the capacitor and output to a load;
   a first comparator configured to compare the output voltage smoothed by the capacitor and the first reference voltage;
   a second comparator configured to compare the output voltage smoothed by the capacitor and a second reference voltage lower than the first reference voltage;
   a latch circuit configured to receive a comparison result from the first comparator and a comparison result from the second comparator; and
   a controller configured to:
   control, in a case where the first mode is instructed by a switching signal which is received from outside and instructs switching of the first mode and the second mode, an oscillation operation timing of the oscillator and an oscillation frequency that changes a voltage excited on the secondary side of the transformer based on an output from the amplifier; and
   control, in a case where the second mode is instructed by the switching signal, the oscillation operation timing of the oscillator and the oscillation frequency that changes the voltage excited on the secondary side of the transformer based on an output from the latch circuit.

2. The apparatus according to claim 1, further comprising: a rectifier configured to rectify the voltage output from the secondary side of the transformer.

3. The apparatus according to claim 1, wherein the first mode is a normal mode, and
   the second mode is a power saving mode in which a power consumption amount per unit time is less than that in the normal mode.

4. The apparatus according to claim 1, wherein the load is at least one of a motor, a head driver, or a printhead.

5. A power supply apparatus that includes a current resonance switching power source and operates in one of a first mode and a second mode, comprising:
   a transformer, including a current resonance circuit, configured to output, to a secondary side, a voltage different from a voltage received on a primary side;
   an oscillator configured to perform an oscillation operation to the transformer;
   a first reference voltage source configured to output a first reference voltage;
   a second reference voltage source configured to output a second reference voltage lower than the first reference voltage; and a controller configured to:
control, in a case where the first mode is instructed by a switching signal which is received from outside and instructs switching of the first mode and the second mode, an oscillation operation timing of the oscillator and an oscillation frequency that changes a voltage excited on the secondary side of the transformer in accordance with a difference between the first reference voltage and an output voltage from the transformer, and
generate, in a case where the second mode is instructed by the switching signal, a control signal in accordance with a comparison result of the first reference voltage and the output voltage from the transformer and a comparison result of the second reference voltage and the output voltage from the transformer, wherein
the oscillation operation timing of the oscillator and the oscillation frequency that changes the voltage excited on the secondary side of the transformer is controlled based on the control signal,
the oscillation frequency of the oscillator changes in accordance with the control signal voltage,
in a case where the control signal voltage is less than a first threshold, the oscillator stops oscillating, and
in a case where the control signal voltage is the first threshold, the oscillator oscillates at a highest frequency, and
the oscillation frequency decreases to a lowest frequency as the control signal voltage increases.

6. The apparatus according to claim 1, further comprising:
a switching unit configured to cause, in a case where a power supply is input to the power supply apparatus, the power supply apparatus to operate in the second mode to initialize the control unit and then the power supply apparatus to operate in the first mode after the initialization.

7. The apparatus according to claim 6, wherein the switching unit waits to receive a print instruction and causes, in a case where the switching unit does not receive the print instruction in a predetermined time, the power supply unit to operate in the second mode.

8. The apparatus according to claim 1, wherein the apparatus holds a rolled print paper.

9. The apparatus according to claim 1, wherein the apparatus holds a cut paper.

10. The apparatus according to claim 5, wherein the load is at least one of a motor, a head driver, or a printhead.

11. The apparatus according to claim 5, wherein in a case where the oscillation frequency is high, a voltage excited on the secondary side of the transformer is low, and in a case where the oscillation frequency is low, the voltage excited on the secondary side of the transformer is high.

12. The apparatus according to claim 5, wherein the first mode is a normal mode, and the second mode is a power saving mode in which a power consumption amount per unit time is less than that in the normal mode.

13. A printing apparatus that includes a current resonance switching power source and operates in one of a first mode and a second mode, comprising:
a transformer, including a current resonance circuit, configured to output, to a secondary side, a voltage different from a voltage received on a primary side;
an oscillator configured to perform an oscillation operation to the transformer;
a capacitor configured to smooth the voltage output by the transformer;
an amplifier configured to output a different current in accordance with a difference between a first reference voltage and an output voltage smoothed by the capacitor and output to a load;
a first comparator configured to compare the output voltage smoothed by the capacitor and the first reference voltage;
a second comparator configured to compare the output voltage smoothed by the capacitor and a second reference voltage lower than the first reference voltage;
a latch circuit configured to receive a comparison result from the first comparator and a comparison result from the second comparator; and
a controller configured to:
control, in a case where the first mode is instructed by a switching signal which is received from outside and instructs switching of the first mode and the second mode, an oscillation operation timing of the oscillator and an oscillation frequency that changes a voltage excited on the secondary side of the transformer based on an output from the amplifier; and
control, in a case where the second mode is instructed by the switching signal, the oscillation operation timing of the oscillator and the oscillation frequency that changes the voltage excited on the secondary side of the transformer based on an output from the latch circuit.

* * * * *